United States Patent
Crandall et al.

(10) Patent No.: US 7,587,047 B2
(45) Date of Patent: Sep. 8, 2009

(54) CHAOS GENERATOR FOR ACCUMULATION OF STREAM ENTROPY

(75) Inventors: Richard E. Crandall, Portland, OR (US); Douglas P. Mitchell, Lake Forest Park, WA (US); Scott Krueger, Mountain View, CA (US); Guy Tribble, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 805 days.

(21) Appl. No.: 11/159,657

(22) Filed: Jun. 22, 2005

(65) Prior Publication Data

US 2006/0291649 A1    Dec. 28, 2006

(51) Int. Cl.
*H04L 9/00* (2006.01)
(52) U.S. Cl. .................. 380/46; 380/263; 713/176
(58) Field of Classification Search ............ 380/46, 380/263; 713/176
See application file for complete search history.

(56) References Cited

U.S. PATENT DOCUMENTS

| | | | | |
|---|---|---|---|---|
| 5,159,632 A * | 10/1992 | Crandall | ............ | 380/28 |
| 5,271,061 A * | 12/1993 | Crandall | ............ | 380/28 |
| 5,463,690 A * | 10/1995 | Crandall | ............ | 380/30 |
| 5,581,616 A * | 12/1996 | Crandall | ............ | 380/28 |
| 5,850,450 A * | 12/1998 | Schweitzer et al. | ............ | 380/30 |
| 6,014,445 A * | 1/2000 | Kohda et al. | ............ | 380/28 |
| 6,064,738 A * | 5/2000 | Fridrich | ............ | 380/28 |
| 6,226,383 B1 * | 5/2001 | Jablon | ............ | 380/30 |
| 6,243,467 B1 * | 6/2001 | Reiter et al. | ............ | 380/30 |
| 6,263,146 B1 * | 7/2001 | Umeno et al. | ............ | 385/147 |
| 6,285,760 B1 * | 9/2001 | Crandall | ............ | 380/30 |
| 6,289,296 B1 * | 9/2001 | Umeno | ............ | 703/2 |
| 6,307,935 B1 * | 10/2001 | Crandall et al. | ............ | 380/28 |
| 6,307,938 B1 * | 10/2001 | Matyas et al. | ............ | 380/44 |
| 6,466,668 B1 * | 10/2002 | Miyazaki et al. | ............ | 380/30 |
| 6,687,721 B1 * | 2/2004 | Wells et al. | ............ | 708/250 |
| 6,792,111 B1 * | 9/2004 | Italia et al. | ............ | 380/263 |
| 6,792,533 B2 * | 9/2004 | Jablon | ............ | 713/171 |
| 6,892,940 B2 * | 5/2005 | Kocarev et al. | ............ | 235/380 |

(Continued)

OTHER PUBLICATIONS

Guajardo, J., "Efficient Implementation of Elliptic Curve Cryptosystems on the TI MSP 430×33× Family of Microcontrollers," In K. Kim (Ed.): PKC 2001, LNCS 1992, pp. 365-382, Korea, Feb. 2001 © Springer-Verlag Berlin Heidelberg 2001.

(Continued)

*Primary Examiner*—David García Cervetti
(74) *Attorney, Agent, or Firm*—Morgan, Lewis & Bockius LLP (57) ABSTRACT

A chaos generator for accumulating stream entropy is disclosed. The chaos generator includes a random source coupled to an entropy accumulator that is configurable for generating a binary random input sequence. The entropy accumulator is configurable for accumulating entropy of the input sequence and providing a binary random output sequence based on the accumulated entropy. The binary random output sequence is reduced by a modular reduction operation having a modulus that is set equal to a cryptographic prime (e.g., the order of an elliptic curve). The number of iterations performed by the entropy accumulator on the binary random input sequence is selected to provide a binary random output sequence having a desired cryptographic strength. The chaos generator can be part of a signing and verification system that uses fast elliptic encryption for small devices.

29 Claims, 8 Drawing Sheets

U.S. PATENT DOCUMENTS

| | | | |
|---|---|---|---|
| 7,010,692 B2 * | 3/2006 | Jablon | 713/171 |
| 7,106,864 B2 * | 9/2006 | Kocarev et al. | 380/263 |
| 7,181,017 B1 * | 2/2007 | Nagel et al. | 380/282 |
| 7,218,735 B2 * | 5/2007 | Coron et al. | 380/30 |
| 7,269,614 B2 * | 9/2007 | Wells et al. | 708/250 |
| 7,350,083 B2 * | 3/2008 | Wells et al. | 713/193 |
| 7,430,292 B2 * | 9/2008 | LaPat et al. | 380/42 |
| 2002/0087872 A1 * | 7/2002 | Wells et al. | 713/193 |
| 2002/0129247 A1 * | 9/2002 | Jablon | 713/169 |
| 2002/0131592 A1 * | 9/2002 | Hinnant | 380/46 |
| 2002/0172359 A1 * | 11/2002 | Saarinen | 380/46 |
| 2002/0176578 A1 * | 11/2002 | LaPat et al. | 380/265 |
| 2003/0152218 A1 * | 8/2003 | Coron et al. | 380/30 |
| 2003/0219120 A1 * | 11/2003 | Kocarev et al. | 380/28 |
| 2004/0042675 A1 * | 3/2004 | Kobayashi | 382/245 |
| 2004/0064438 A1 * | 4/2004 | Kostoff | 707/1 |
| 2004/0078570 A1 * | 4/2004 | Geiringer et al. | 713/165 |
| 2004/0078576 A1 * | 4/2004 | Geitinger | 713/181 |
| 2004/0083251 A1 * | 4/2004 | Geiringer et al. | 708/492 |
| 2004/0109567 A1 * | 6/2004 | Yang et al. | 380/277 |
| 2004/0223616 A1 * | 11/2004 | Kocarev et al. | 380/263 |
| 2004/0223619 A1 * | 11/2004 | Jablon | 380/277 |
| 2004/0248549 A1 * | 12/2004 | Drews | 455/410 |
| 2005/0180522 A1 * | 8/2005 | Carroll | 375/295 |
| 2006/0167784 A1 * | 7/2006 | Hoffberg | 705/37 |
| 2007/0189527 A1 * | 8/2007 | Brown et al. | 380/44 |

OTHER PUBLICATIONS

Schroeppel, et al. "A Low-Power Design for an Elliptic Curve Digital Signature Chip" Presented at Sandia National Laboratories Aug. 14, 2002.

Crandall, R., *Prime Numbers A Computational Perspective*, © 2001 Springer-Verlag New York, Inc. Chapter 7-9.

* cited by examiner

CHAOS GENERATOR FOR ACCUMULATION OF STREAM ENTROPY

RELATED APPLICATION

This application is related to U.S. application Ser. No. 11/051,441, filed Feb. 3, 2005, entitled "Small Memory Footprint Fast Elliptic Encryption," which application is incorporated by reference herein in its entirety.

TECHNICAL FIELD

The disclosed embodiments relate generally to cryptography and in particular to the generation of secure random numbers for use in cryptographic systems.

BACKGROUND

Since the advent of public-key cryptography, numerous public-key cryptographic systems have been proposed. Today, only three types of systems are still considered secure and efficient. These systems include integer factorization systems, discrete logarithm systems and elliptic curve cryptography (ECC) systems. The security afforded by integer factorization rests on the difficulty of factoring a large product of two prime numbers. The security of discrete logarithm systems rests on the difficulty of solving the discrete logarithm problem (DLP). The security of ECC systems rests on the difficulty of solving the elliptic curve DLP (ECDLP) problem, which amounts to finding a log in a group of points defined on an elliptic curve over a prime field. ECC's advantage over other systems is that its inverse operation gets harder, faster, against increasing key length, making it suitable for portable devices having small form factors with limited power and memory.

Cryptographic systems, and particularly stream ciphers, often use pseudorandom number generators to provide sequences of random numbers. Such random number generators can produce, at most, only $2^k$ different output values, where k is the number of bits used to represent internal state data. The pseudorandom number generator often is initialized in an arbitrary state of a repeating sequence of states (i.e., a cycle) as some function of a keyword or key phrase. Thus, an arbitrary initialization of a pseudorandom sequence may result in a short cycle or pattern of different output values that could repeat during a long message or session. These repeated patterns make pseudorandom number generators vulnerable to automated attacks. To prevent patterns from occurring, longer sequences (large k values) can be used. However, for devices having small form factors (e.g., media players, mobile phones, etc.), power and memory constraints limit the length of the random number sequences that can be generated, resulting in an increased risk that detectable patterns will be generated.

Therefore, what is needed is a system, method and apparatus for providing random numbers of cryptographic strength that are suitable for use in cryptographic systems for small devices.

SUMMARY OF EMBODIMENTS

A chaos generator for accumulating stream entropy is disclosed. The chaos generator includes a random-source coupled to an entropy accumulator that is configurable for generating a binary random input sequence. The entropy accumulator is configurable for accumulating entropy of the input sequence and providing a binary random output sequence based on the accumulated entropy. The binary random output sequence is reduced by a modular reduction operation having a modulus that is set equal to a cryptographic prime (e.g., the order of an elliptic curve). The number of iterations performed by the entropy accumulator on the binary random input sequence is selected to provide a binary random output sequence having a desired cryptographic strength. The chaos generator can be part of a signing and verification system that uses fast elliptic encryption for small devices.

DESCRIPTION OF EMBODIMENTS

Chaos Generator Overview

Figure 1:
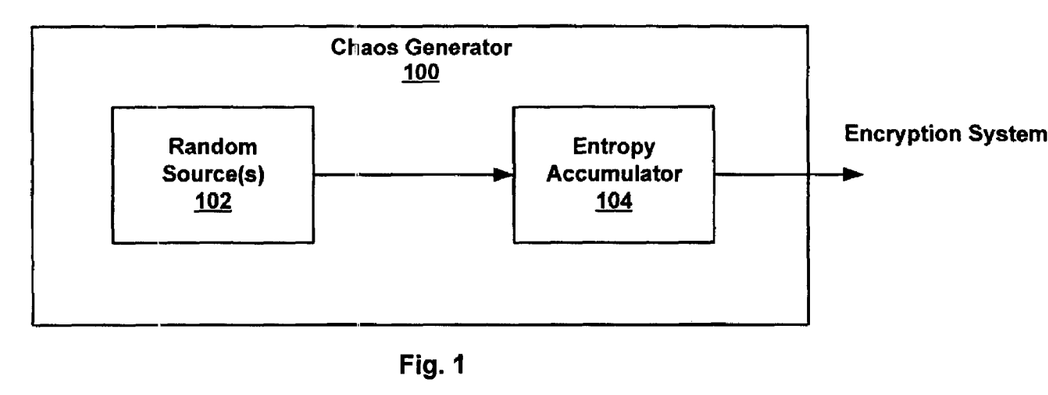
FIG. 1 is a block diagram of one embodiment of a chaos generator.

FIG. 1 is a block diagram of one embodiment of a chaos generator 100 for generating cryptographically secure random numbers. The chaos generator 100 includes a low-entropy random source 102 coupled to an entropy accumulator 104. In some embodiments, the random source 102 is a small device having, for example, a processor chip and various hardware clocks for generating m-bit words $W_n = \{w_0, w_1, w_2, \ldots\}$. The words $w_n$ are provided as a binary random input sequence to the entropy accumulator 104, which "accumulates" the entropy of the input sequence and provides a binary random output sequence comprising q-bit blocks (e.g., 128 or 160 bits per block), which are more suitable for use with cryptographic systems. The entropy accumulator 104 effectively scrambles the accumulated bits, so as to avoid accidental patterns in the words $W_n$ provided by the random source 102.

An example of an entropy accumulator 104 is a chaotic map, such as a quartic chaotic map given by $$r_{n+1} = ((r_n + w_n)^4 + (r_n + n)^4) \bmod p, \quad (1)$$

where $r_{n+1}$ is the q-bit output of the entropy accumulator 104, $w_n$ is the m-bit input word received from the low-entropy random source 102, p is a cryptographic prime appropriate to the cryptography in force, and n is an integer that is incremented each time equation (1) is executed. In some embodiments, n can be initially set to zero.

Primes that are suitable for use with small memory fast elliptic encryption systems (SFEE) have the prime characteristic $$p = w^s - k, \ k \in [1, w-1], \ k \equiv 1 \pmod{4}, \quad (2)$$

wherein w is a word size for the field arithmetic (e.g., $w=2^{16}$ bits), and s is a chosen integer exponent, which can be used to set the security level of the SFEE (e.g., s=10).

It should be apparent that the entropy accumulator 104 is not limited to the expression of equation (1). Rather, other chaos systems can be used as an entropy accumulator 104, including other algebraic forms or expressions, such as exponentiation modulo p, higher powers, and the like. It is noted, however, that the speed of the quartic chaotic map makes it ideally suited for small devices with limited processing power, such as portable electronic devices (e.g., media players, digital cameras, mobile phones, etc.). For some SFEE systems, a suitable prime p (e.g., 128 or 160 bits) would have the property p≡3 mod 4.

A more detailed discussion of suitable primes for SFEE systems can be found in U.S. application Ser. No. 11/051,441. Various embodiments of FEE systems are described in U.S. Pat. No. 6,307,935, issued Oct. 23, 2001, entitled "Method and Apparatus For Fast Elliptic Encryption With Direct Embedding," and U.S. Pat. No. 6,285,760, issued Sep. 4, 2001, entitled "Method and Apparatus For Digital Signature Authentication," each of which is incorporated herein by reference in its entirety.

Entropy Accumulator System

Figure 2:
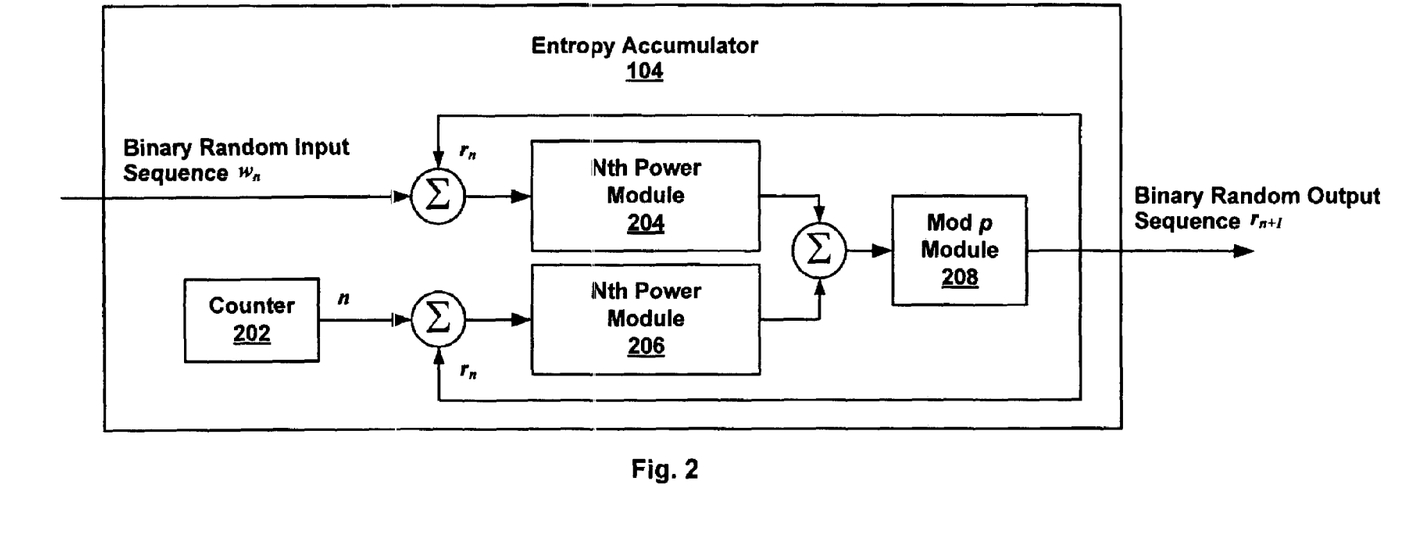
FIG. 2 is a block diagram of one embodiment of an entropy accumulator.

FIG. 2 is a block diagram of one embodiment of the entropy accumulator 104 shown in FIG. 1. The entropy accumulator 104 includes counter 202, nth power modules 204, 206 and mod p module 208. In some embodiments, the entropy accumulator 104 receives a binary random input sequence from a low-entropy random device 102. The input sequence can be received as a sequence of words $W_n$ (e.g., 16 bits), which are summed with the previous output $r_n$ of the entropy accumulator 104 to provide a first sum. The first sum is received by the nth power module 204, which computes the nth power of the first sum (e.g., a power of 4). The counter 202 provides a count n, which is summed with the previous output $r_n$ of the entropy accumulator 104 to provide a second sum. The second sum is received by the nth power module 206, which computes the nth power of the second sum (e.g., a power of 4). The outputs of the nth power modules 204, 206, are then summed to provide a third sum. The third sum is received by the mod p module 208, which reduces the third sum using a modulo p operation to provide a wide random number $r_{n+1}$ of about size p (e.g., 128 or 160 bits). The random numbers $r_{n+1}$ can be organized into a binary random output sequence suitable for use by cryptographic systems.

Although the entropy accumulator 104 implements the expression of equation (1), it should be apparent that other types of entropy accumulators will have different numbers and types of steps and/or modules depending upon the chaos system used. For example, a chaos system that performs an exponentiation mod p operation would include a module for performing exponentiation.

Chaos Generator Process Flows

Figure 3:
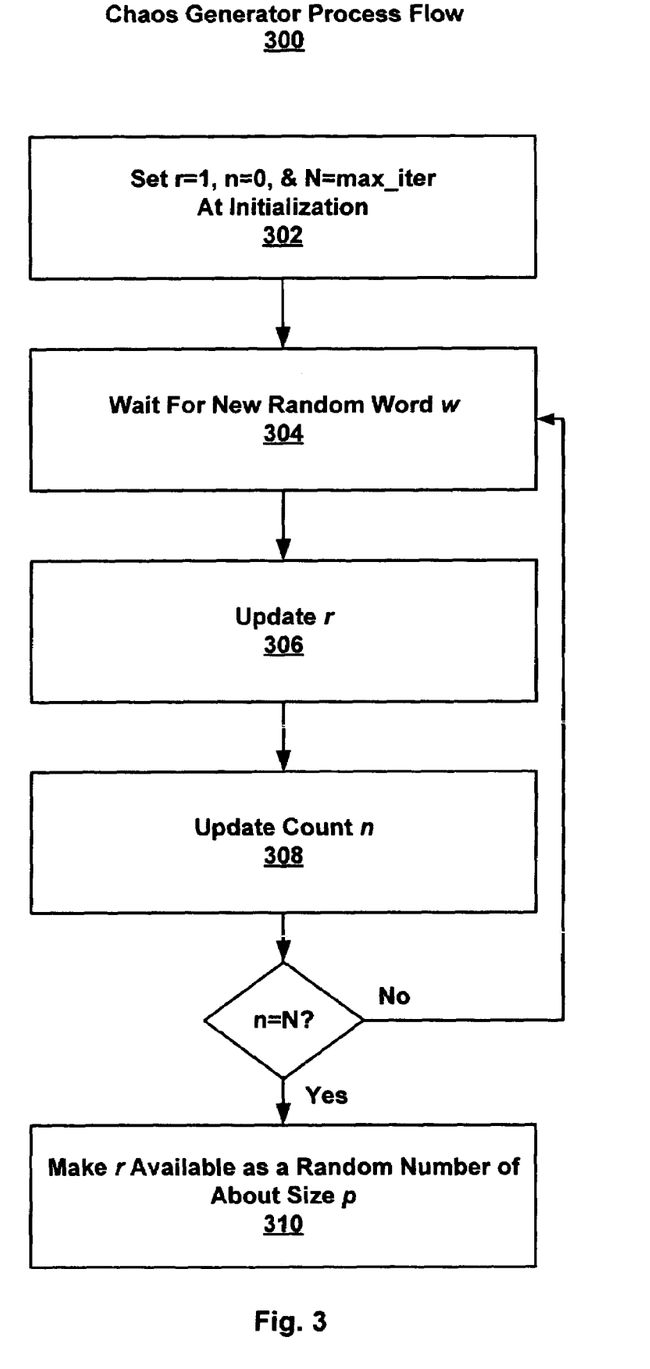
FIG. 3 is a flow diagram of one embodiment of an entropy accumulator process flow.

FIG. 3 is a flow diagram of one embodiment of a chaos generator process flow 300. While the process 300 described below includes a number of steps that appear to occur in a specific order, it should be apparent that the process 300 can include more or fewer steps, which can be executed serially or in parallel (e.g., using parallel processors or a multithreading environment).

The process 300 is initialized (step 302) by setting r=1, n=0 and N=max_iter, where max_iter is the number of iterations of the process flow 300 with a new random word w. In order for r to be cryptographic strength, N can be selected to be at least $$N = \left\lceil \frac{\log_2 p}{E} \right\rceil, \quad (4)$$

where p is a cryptographic prime and E is the estimated entropy of the binary random input sequence (e.g., 2.9 bits per w sample). A procedure for estimating the entropy of a binary random input sequence is described in Appendix A.

After initialization, the process 300 waits (step 304) for a new random word w from a low-entropy random device. When the random word w is received, the wide random number r is updated using, for example, equation (1). Next, the count n is updated (step 308) and compared with N. If the count n is equal to N, then r is made available as a wide random number of about size p (step 310). If the count n is not equal to N, then the process flow 300 returns to step 304 to receive another new random word w from the low-entropy random device.

Figure 4:
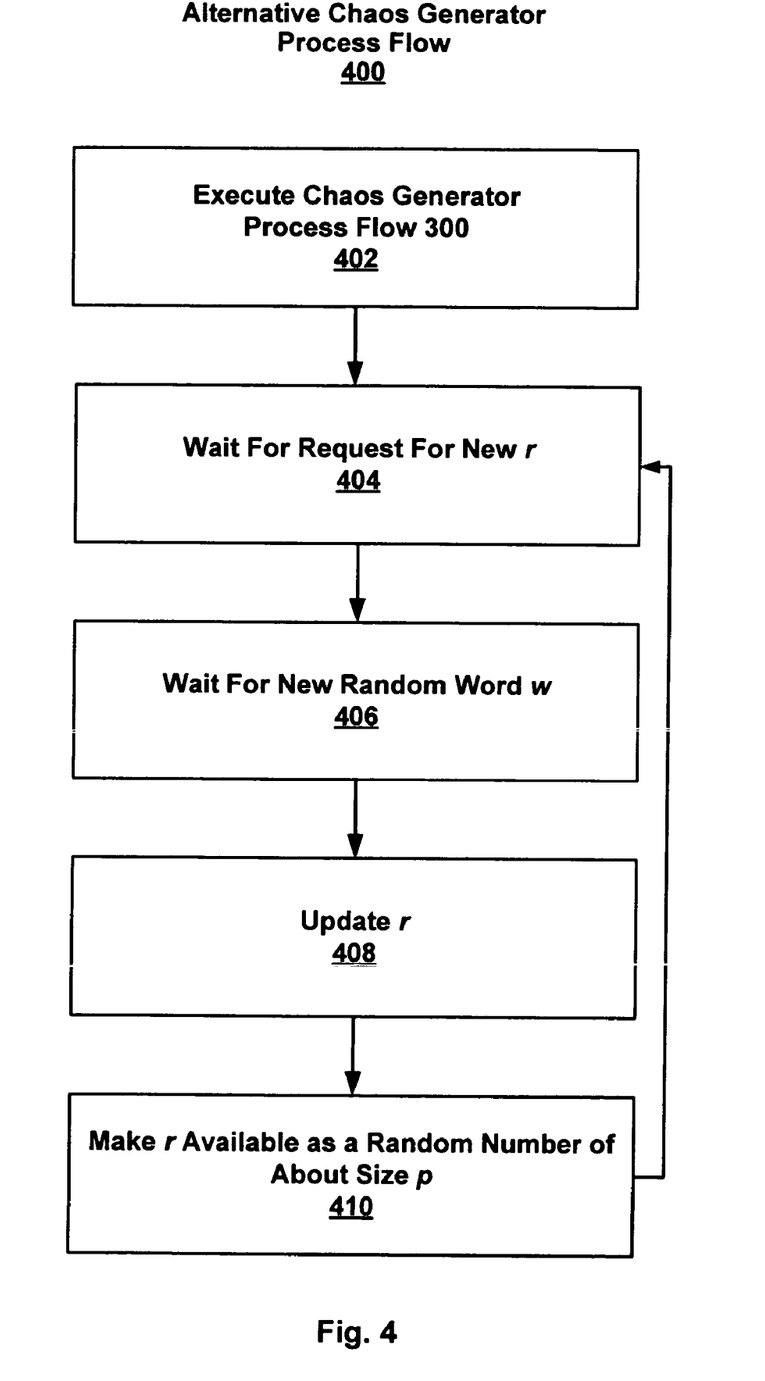
FIG. 4 is a flow diagram of another embodiment of an entropy accumulator process flow.

FIG. 4 is a flow diagram of one embodiment of a chaos generator process flow 400. While the process 400 described below includes a number of steps that appear to occur in a specific order, it should be apparent that the process 400 can include more or fewer steps, which can be executed serially or in parallel (e.g., using parallel processors or a multithreading environment).

The process 400 begins by executing the chaos generator flow 300 described with respect to FIG. 3 (step 402). Upon completion of the process flow 300, the process flow 400 waits for a request for a new r (step 404). When a request is received, the process 400 waits for a new random word w (step 406). Upon receipt of the new random word w, r is updated (step 408) and made available as random number of about size p (step 10).

The chaos generator process flows 300 and 400 described above are two examples of how to accumulate the entropy of a binary random input sequence and provide a wide, binary random output sequence based on the accumulated entropy, such that the output sequence has a higher entropy than the input sequence. It should be apparent that other process flows can be used depending upon the application. For example, it may be sufficient to iterate the quartic chaotic map in equation (1) with no change in w. Generally, when all r values are entirely private, as is the case in some digital signature systems, the process flow 400 can be used to speed up the chaos generator 100. However, when r is public, the more secure process flow 300 may be desirable because it reveals minimum information about the underlying small entropy random device (e.g., repeating patterns).

Signature Signing and Verification System

Figure 5:
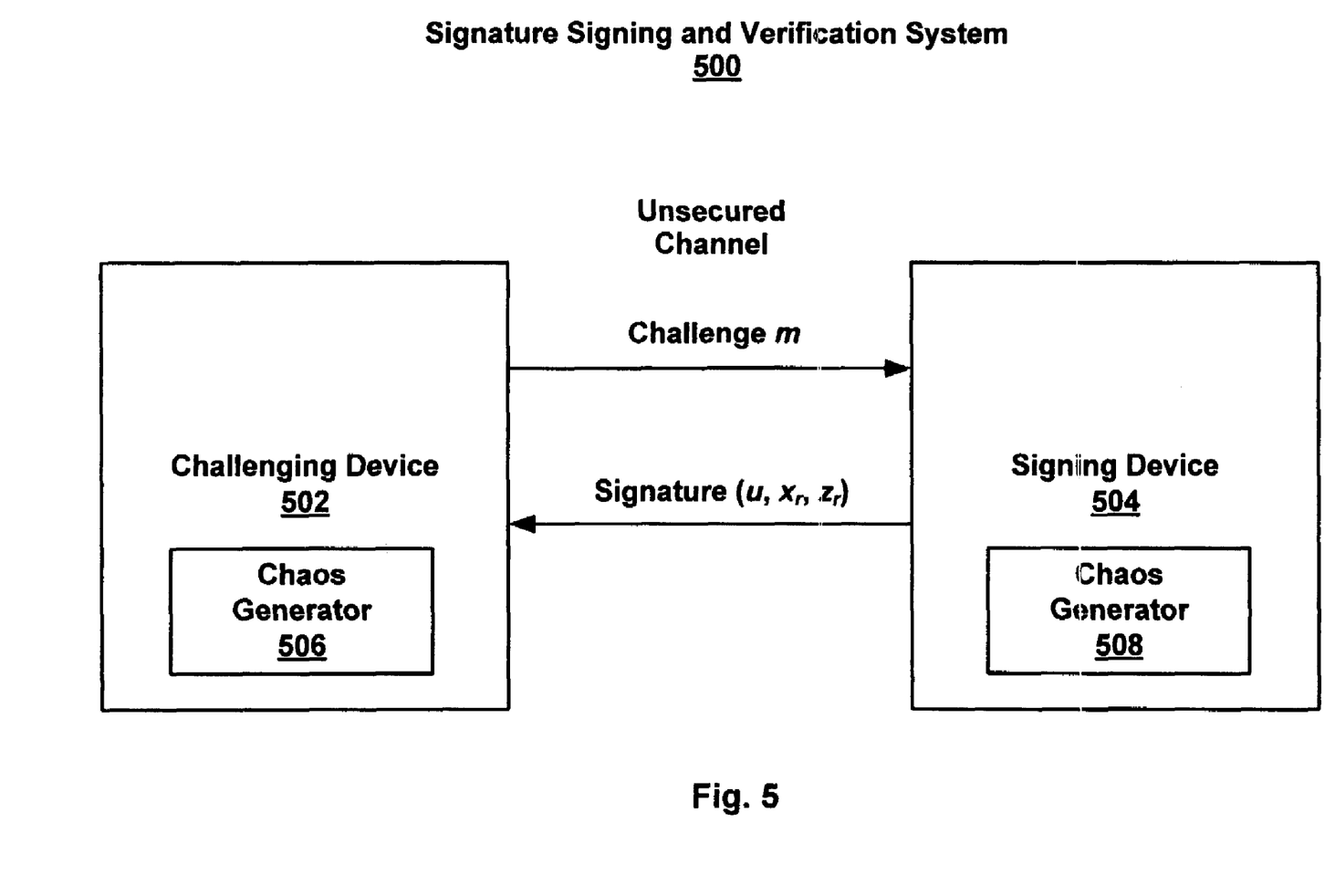
FIG. 5 is a block diagram of one embodiment of a signature signing and verification system.

FIG. 5 is a block diagram of one embodiment of a signature signing and verification system 500, which was described in U.S. patent application Ser. No. 11/051,441. The system 500 includes a challenging device 502 coupled to a signing device 504 via an unsecured communications channel. The challenging device 502 and signing device 504 can be any type of memory constrained communication device, including but not limited to, computers, network devices, media players (e.g., music recorders/players), smart cards, email devices, instant messaging devices, mobile phones, digital cameras, personal digital assistants (PDAs), docking stations and the like. The unsecured channel can be any physical and/or wireless link or connection, including but not limited to, buses and networks (e.g., Universal Serial Bus (USB), IEEE 1394 (FireWire™), Ethernet, Internet, WLAN, etc.).

The challenging device 502 sends a challenge m to the signing device 104. In some embodiments, the challenge m is a random number generated by a chaos generator 506 in the challenging device 502. The random number m is constrained to be an integer within the interval m∈[2,o−1], where o is the order of an elliptic curve. The chaos generator 506 can be implemented in hardware or software or a combination of both. An example of a suitable chaos generator 506 is chaos generator 100, as described with respect to FIGS. 1 and 2.

The signing device 504 receives the random number m from the unsecured channel and performs a signing operation using a chaos generator 508. The result of the signing operation is a digital signature represented by the parameter triplet (u, $x_r$, $z_r$). The challenging device 502 receives the triplet from the signing device 504 and performs a verification process using a chaos generator 506, as described with respect to FIG. 7. The chaos generators 506, 508, can be implemented in hardware or software or a combination of both. An example of suitable chaos generators 506, 508 is chaos generator 100, as described with respect to FIGS. 1 and 2.

If verification results in a valid signature, then a communication session can be established between the challenging device 502 and the signing device 504. The system 500 can be used for a variety of applications requiring digital signature signing and verification. For example, a media player can use the system 500 to prevent unauthorized devices (e.g., computer, smart card, camera, speaker system, accessory devices, etc.) from receiving or sending files or other information from or to the media player. In some embodiments, successful signature verification allows certain functionality in the challenging device 502 to be accessed or unlocked that otherwise would not have been available to the challenging anchor signing devices 502, 504.

Figure 6:
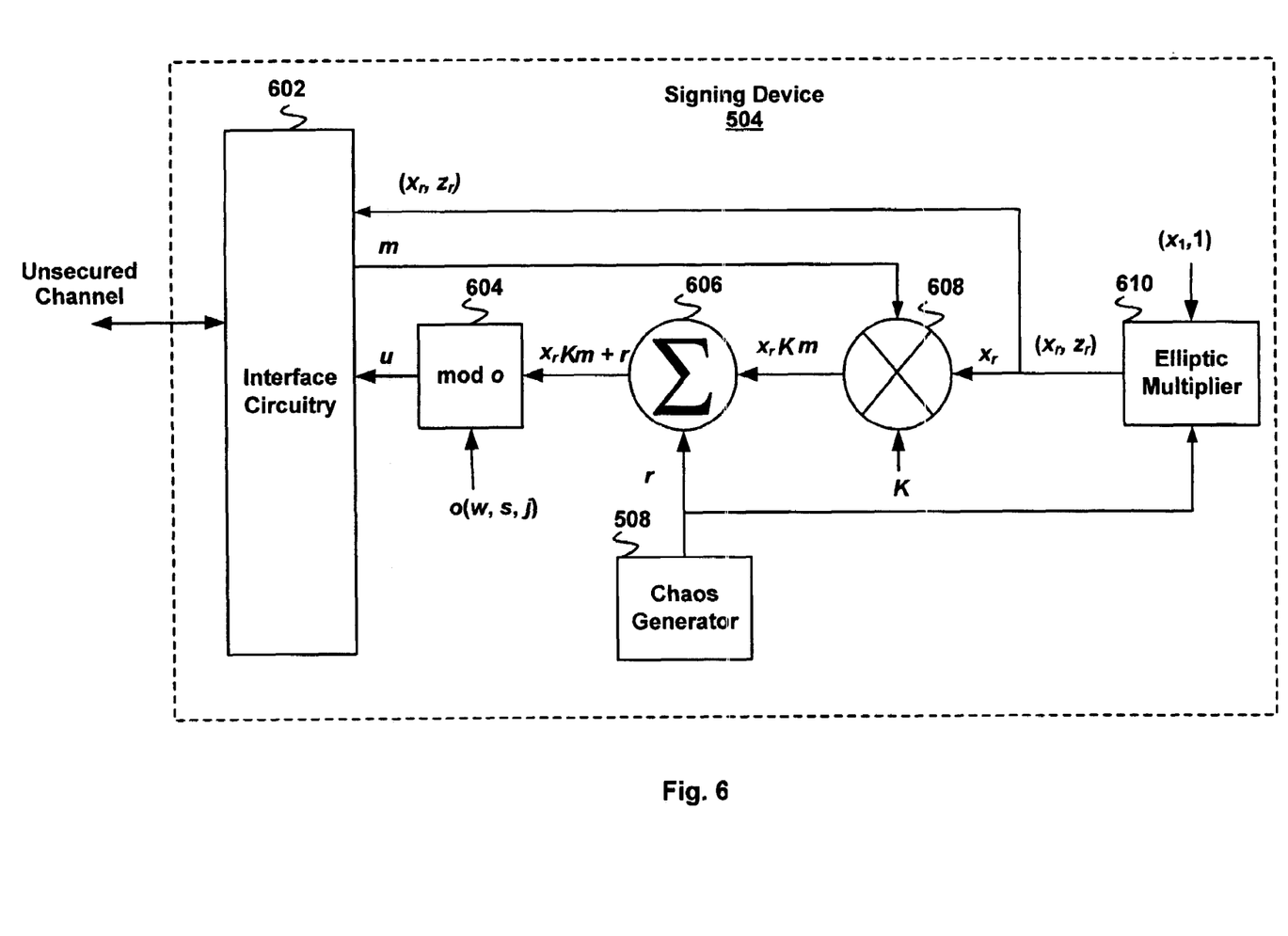
FIG. 6 is a block diagram of one embodiment of the signing device shown in FIG. 5.

FIG. 6 is a block diagram of one embodiment of the signing device 504 shown in FIG. 5. The signing device 504 includes interface circuitry 602, mod module 604, summing module 606, multiply module 608, elliptic multiplier module 610 and chaos generator 508. Each of the modules, 604, 606, 608 and 610 can be implemented in hardware or software or a combination of both, for example, using a set of arithmetic computation circuits and one or more finite state machines to perform the signature generation process or portions of that process.

The interface circuitry 602 includes circuitry for establishing and maintaining a connection and communication session with other devices or with a network. Such circuitry may include a transmitter, a receiver, line drivers, buffers, logic devices, signal conditioning circuitry, etc. If the signing device 504 is wireless, then the interface circuitry 602 would include appropriate wireless circuitry (e.g., a wireless transceiver) for establishing and maintaining a wireless communication session with another device or network.

In some embodiments, the challenging device 502 generates a random integer m∈[2, o−1] using the chaos generator 506 and sends it to the signing device 504 over a communication channel (shown as an unsecured channel in FIG. 5). The random number m is received by the interface circuitry 602 and supplied to the multiply module 608. The multiply module 608 forms a product from the random number m a private key K and the field element $x_r$. The field element $x_r$ is computed by the elliptic multiplier module 610 based on the formula $$(x_r, z_r) = r \cdot (x_1, 1), \tag{5}$$

wherein r is the random number generated by the chaos generator 508 and $(x_1, 1)$ is an initial public point on the elliptic curve in Montgomery form. Note that in some embodiments, the random number r is in the interval [2, o−1] and is further constrained to have a low Hamming weight (e.g., 48). The "1" bits, however, can be in any bit position.

The multiply module 608 forms a product $x_r K m$ using non-field multiplication, wherein $x_r$ is the x field element of the point $(x_r, z_r)$ on the elliptic curve, K is a private key and m is the random number sent by the challenging device 502. Using non-field addition, the summing module 606 adds the product to the random number r to form the sum $x_r K m + r$. The mod module 604 reduces this value by the curve order o using fast modular operations to produce a signature component u given by $$u := (x_r K m + r) \bmod o. \tag{6}$$

The signature component u and the field elements $x_r$, $z_r$ are then sent to the challenging device 502 as a digital signature packet via the interface circuitry 602.

Figure 7:
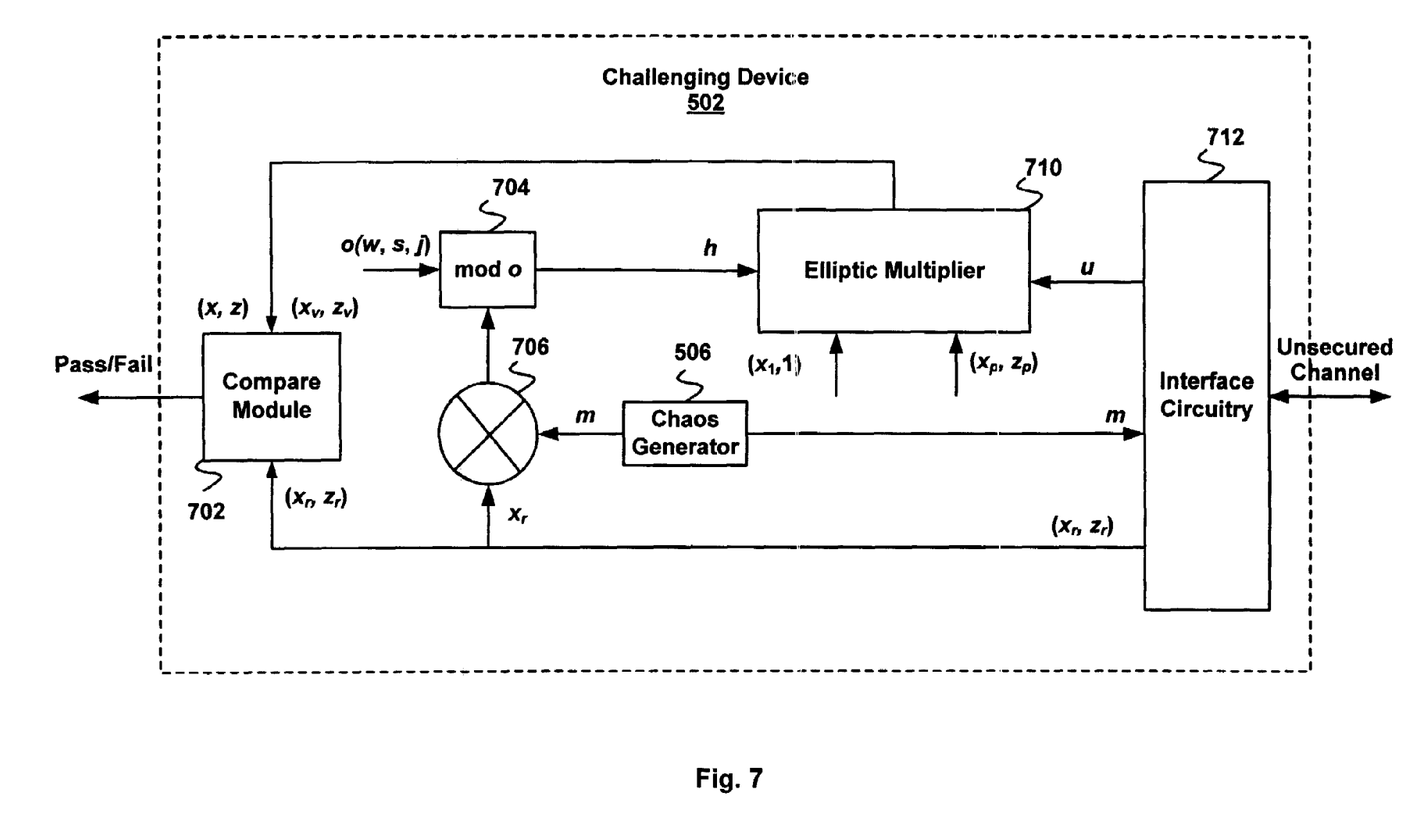
FIG. 7 is a block diagram of one embodiment of the challenging device shown in FIG. 5.

FIG. 7 is a block diagram of one embodiment of the challenging device 502 shown in FIG. 5. The challenging device 502 includes a compare module 702, mod module 704, non-field multiply module 706, chaos generator 506, elliptic multiplier module 710 and interface circuitry 712. Each of the modules, 702, 704, 706, and 710 can be implemented in hardware or software or a combination of both, for example, using a set of arithmetic computation circuits and one or more finite state machines to perform the signature verification process or portions of that process.

The challenging device 502 receives the signature packet (u, $x_r$, $z_r$) from the signing device 504. The elliptic multiplier module 710 computes the point $$(x, z) = u \cdot (x_1, 1), \tag{7}$$

wherein u is the signature component of the signature packet received from the signing device 504. The point (x, z) is sent to the compare module 702 where it is used to validate the digital signature.

Next, the multiplication module 706 uses non-field multiplication to form a product $x_r m$ from the field element $x_r$ received from the signing device 504 and the random number m generated by the chaos generator 506. This is the same random number m previously sent by the challenging device 502 and used by the signing device 504 to produce its digital signature. The product $x_r m$ is sent to the mod module 704, where it is reduced to a temporary component h using FEE modular operations and a modulus set equal to the curve order o. Thus, the multiplication and modular operations give $$h = x_r m \bmod o \tag{8}$$

The elliptic multiplier module 710 receives the temporary component h and a public key represented by the public point $(x_p, z_p)$ on the elliptic curve, and performs an elliptic multiplication on these values to give $$(x_v, z_v) = h \cdot (x_p, z_p). \tag{9}$$

After computing equation (9), the points $(x_v, z_v)$ and $(x_r, z_r)$ are then sent to the compare module 702 where they are used to validate or invalidate the signature sent by the signing device 504. In some embodiments, the compare module 502 uses the points $(x_v, z_v)$ and (x, z), and the point $(x_r, z_r)$ sent by the signing device 504 to determine whether there is an elliptic identity given by $$(x_r, z_r) \pm (x_v, z_v) == (x, z), \tag{10}$$

wherein the elliptic identity is determined by the algebraic expression $$(x_r z_v - z_r x_v)^2 x^2 - 2xz[(x_r x_v + z_r z_v)(x_r z_v + x_v z_r) + 2cx_r x_v z_r z_v] + (x_r x_v - z_r z_v)^2 = 0, \text{ and} \quad (11)$$

c is the Montgomery parameter for the elliptic curve.

In some embodiments, the sigcompare ($x_r$, $z_r$, $x_v$, $z_v$, x, z) function calculates the algebraic expression modulo the prime p and returns TRUE if and only if the result is 0. Note that the sigcompare( ) function determines whether $P=P_1+/- P_2$ on an elliptic curve, without explicit elliptic addition, as described in U.S. Pat. No. 6,285,760.

Figure 8:
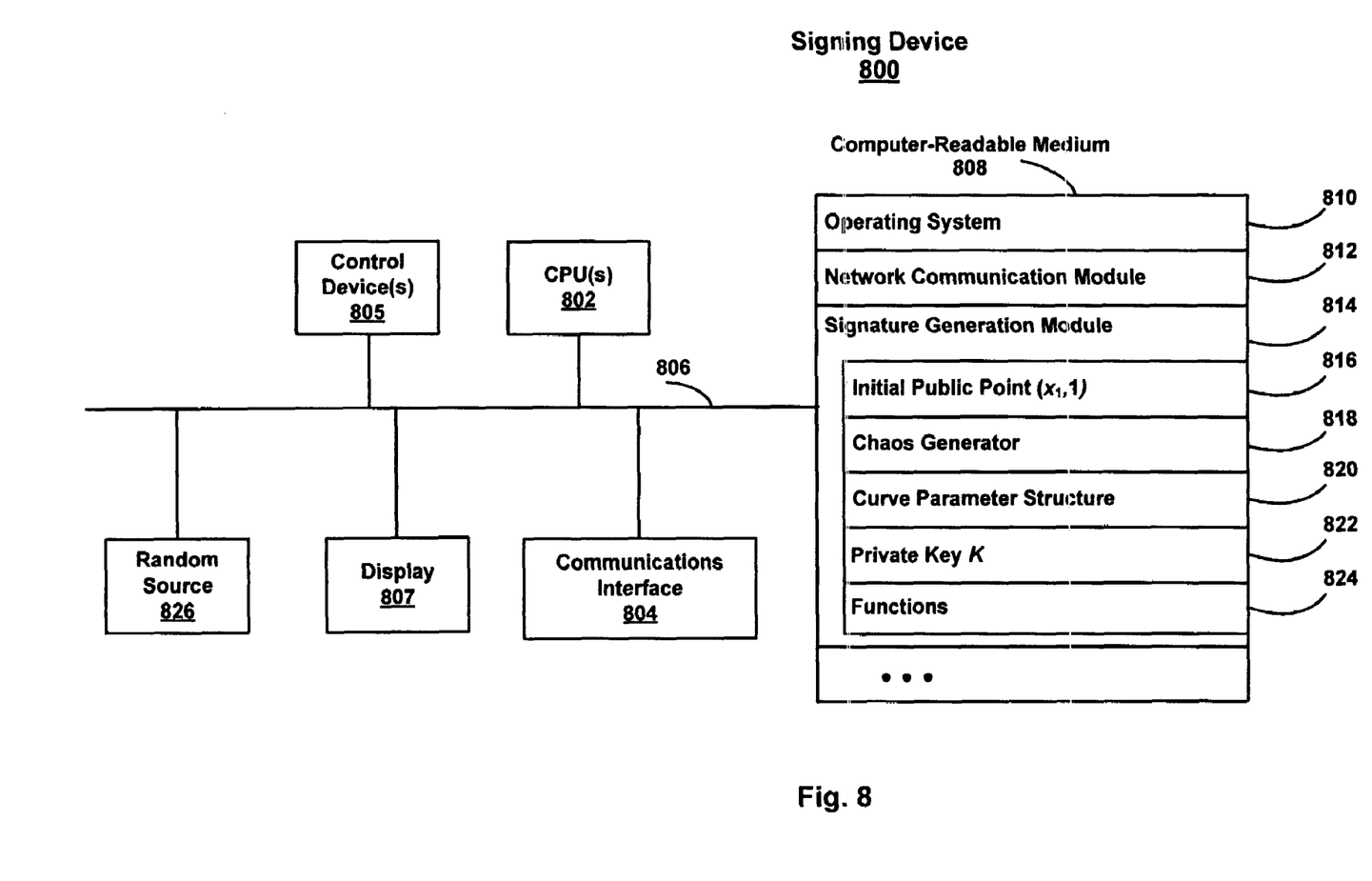
FIG. 8 is a block diagram of one embodiment of a signing device.

FIG. 8 is a block diagram of one embodiment of a signing device 800. The signing device 800 includes one or more buses 806 coupled to one or more processors 802, a communications interface 804, optional control device(s) 805, optional display device(s) 807, a random source 826 (e.g., random number generator) and one or more computer-readable mediums 808. The computer-readable medium(s) 808 can be any device or medium that can store code and/or data for use by the one or more processors 802. The medium can include a memory hierarchy, including but not limited to, cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The computer-readable medium 808 may also include a transmission medium for carrying information-bearing signals indicative of computer instructions or data (with or without a carrier wave upon which the signals are modulated). For example, the transmission medium may include a communications network, including but not limited to, the Internet, intranet(s), Local Area Networks (LANs), Wide Local Area Networks (WLANs), Storage Area Networks (SANs) and the like.

The signing device 800 can optionally include one or more control devices 805 (e.g., mouse and keyboard, or keypad, touch sensitive display, etc.) and may optionally include a display device 607 (e.g., CRT, LCD, etc.) for enabling a user to communicate and control various aspects of the signing device 800. The communications interface 804 can be a port, network interface card, wireless interface card and the like. In some embodiments, the communications interface is a USB or FireWire™ port for connecting directly with a challenging device 502 or indirectly through a network.

The computer-readable medium 808 includes an operating system 810 (e.g., Mac O/S, Linux, Windows™, Unix, etc.) having various software components and drivers for controlling and managing various tasks (e.g., memory management, hard disc control, power management, etc.). A network communication module 812 includes software programs and/or protocol stacks for establishing and maintaining communication links with other devices or networks via the communications interface 804. The computer-readable medium 808 also includes a signature generation module 814, which includes various software components containing code or instructions for performing or controlling the signature generation process. For example, the signature generation module 814 includes the initial public point ($x_1$, 1) 816, a chaos generator 818, a curve parameter structure 820, private key K 822, and various functions 824 for performing the various computations used in SFEE, including but not limited to unsigned finite field arithmetic. The operations of the various software components of the signature generation module 814 have been previously described with respect to FIGS. 5 and 6.

Examples of functions 824 for performing various SFEE calculations in the signature generation process are described in U.S. patent application Ser. No. 11/051,441. In some embodiments, the random source 826 can be implemented completely or partially in hardware, for example, using a set of arithmetic computation circuits and one or more finite state machines to perform the signature generation process or portions of that process.

Curve Parameter Structure

In some embodiments, the curve parameter structure 820 is used to define a complete set of curve parameters. Preferably, the curve parameter structure 820 has a total word size less than a single lGiant's (defined below) allocation. An example of such a curve parameter structure 820 is as follows:

```
paramstruct {
    word16 s;    //Security exponent.
    word16 k;    //The field prime characteristic is p := wˢ - k, with
                   k ∈ [0, w - 1].

lGiant j;    //The curve order is o := wˢ - j, with j → count < 1 + s/2.

word16 x1;   //The initial public point is P₁ := (x₁, 1).
    word16 c;    //Montgomery parameter for elliptic curve
                   y² = x³ + cx² + x.
}
```

Note that the curve parameter structure 820 disclosed above does not explicitly store the field prime characteristic p or the curve order o. In this embodiment, the "word16" type is an unsigned integer of 16 bits and the "lGiant" type has a width of s+1 digits (i.e., arithmetic words). If desired, once j is known, the integer type can be changed to an even smaller integer type, since j will typically be about one half the size of an lGiant type. Assuming a word size of w=$2^{16}$, a suitable curve parameter structure 820 would be:

par→s=10; //Selected for desired level of security.
par→k=57; //Selected so the field prime is p=$2^{160}$−57 (which is not explicitly stored).
par→j=1347399065782960596453580; //Selected so the curve order is o=$2^{160}$−j
par→x1=30; //Selected so the public point is $P_1$:=(30,1), with point order dividing o.
par→c=4; //Selected to provide extra optimization.

With the above parameter assignments, $P_1$=(30, 1) has a point order=curve order=o:=$w^{10}$−j. The curve order o can be factored as:

$$o = 2^{160} - 1347399065782960596453580$$
$$= 1461501637330902918203683485317$$
$$2172366965336089396$$
$$= 2*2*3*3*4059726770363619217$$
$$23245412588158990820378 0261.$$

Thus, the point order of $x_1$, which is also the curve order o, is minimally composite. However, security is still afforded because of the large prime factor of the order. It is well-known that signature schemes work best when the order is minimally composite.

Figure 9:
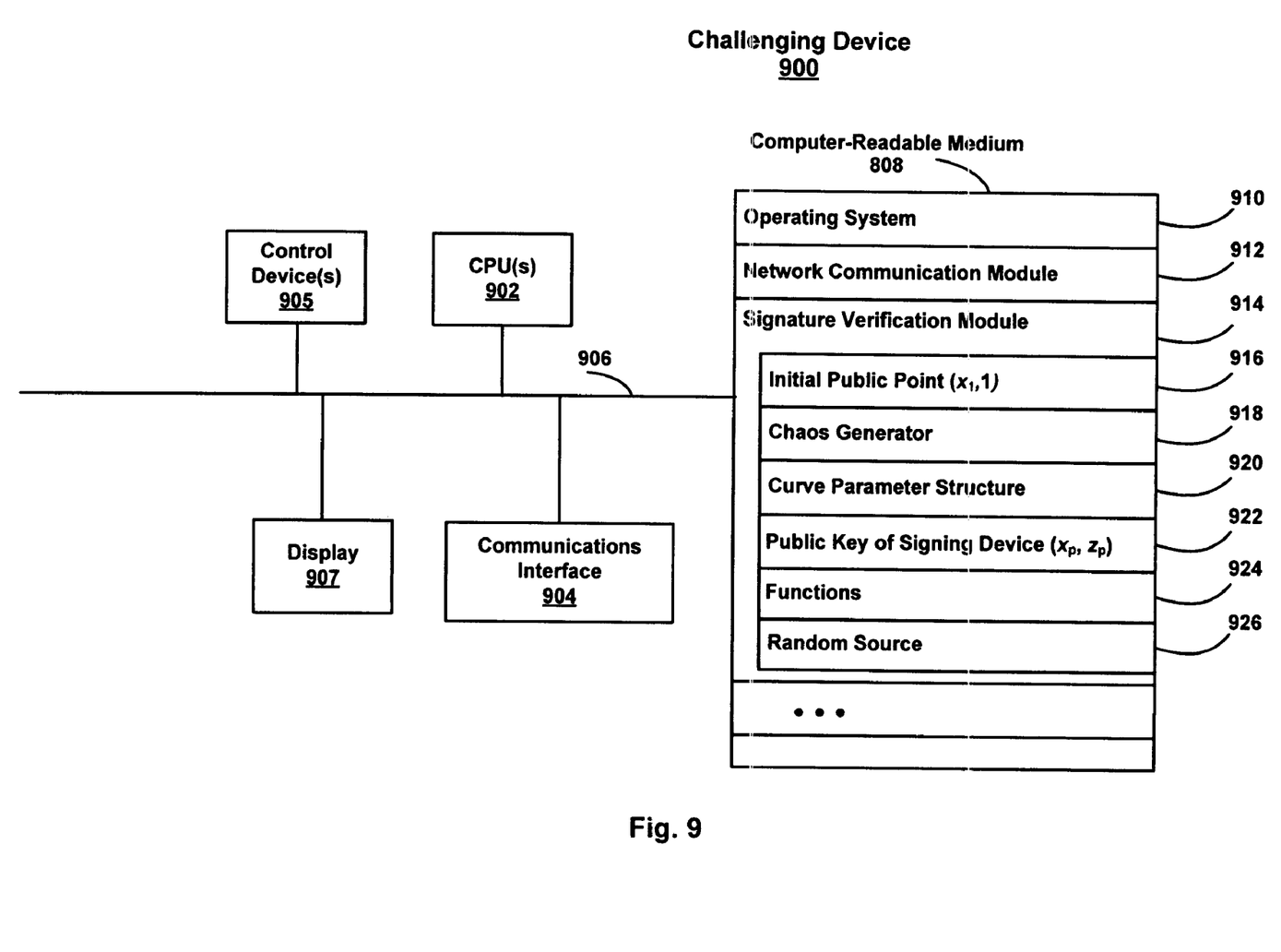
FIG. 9 is a block diagram of one embodiment of a challenging device.

FIG. 9 is a block diagram of one embodiment of a challenging device 900. The challenging device 900 includes one or more buses 906 coupled to one or more processors 902, a communications interface 904, optional control device(s) 905, optional display device(s) 907 and one or more computer-readable mediums 908. All of these components operate as previously described with respect to FIG. 8.

The computer-readable medium 908 includes an operating system 910 (e.g., Mac O/S, Linux, Windows, Unix, etc.) having various software components and drivers, executable by the processor(s) 902, for controlling and managing various tasks (e.g., memory management, hard disc control, power management, etc.). The network communication module 912 includes software programs and/or protocol stacks (executable by the processor(s) 902) for establishing and maintaining communication links with other devices or a network via the communications interface 904. The computer-readable medium 908 also includes a signature verification module 914, which includes various software components containing code or instructions for generating the various steps of the signature verification process. For example, the signature verification module 914 includes the initial public point $(x_1,1)$ 916, a chaos generator 918, a curve parameter structure 920, a public key of the signing device $(x_p, z_p)$ 922, and various functions 924 for performing the various computations used in SFEE, including but not limited to unsigned finite field arithmetic. Unlike, the signing device 800, the challenging device 900 uses a software random source 926 (e.g., pseudo-random number generator). However, the random source 926 could also be implemented in hardware as shown in FIG. 8. The operations of the various software components of the signature verification module 914 have been previously described with respect to FIG. 8. Examples of functions 924 for performing various SFEE calculations in the signature verification module 914 are described in U.S. patent application Ser. No. 11/051,441. The curve parameter structure 920 is the same as the curve parameter structure 820 previously described with respect to FIG. 8.

The disclosed embodiments are not intended to be exhaustive or limited to the precise forms disclosed. Many modifications and variations to the disclosed embodiments are possible in view of the above teachings.

APPENDIX A

Entropy Estimation For Counter Sequence

Entropy estimation for the counter sequence $W_n$.
1. Calculate and store the Fourier transform $W=FFT(\Delta w)$, where $\Delta W = \{w_t - w_{t-1}\}$ is a count-to-count difference.
2. Find a filter parameter $\lambda$ such that the assignments $$W'_k := W_k \frac{\lambda(1-e^{2\pi i k/N})}{1-\lambda e^{2\pi i k/N}},$$

$$\eta' := \text{round}(FFT^{-1}(W')),$$

$$d' := \Delta w - \eta'$$

yield a decomposition, $\Delta w = d' + \eta'$, which is the sum of two integer-valued signals, such that $\eta'$ and the difference signal $\partial'_t = d'_t - d'_{t-1}$ have approximately the same variance.
3. Redefine $\eta := \eta'$ and generate histograms and autocorrelation coefficients, $R_\eta$, $R_\partial$, respectively for $\eta$, $\partial$;
4. Report intrinsic entropy estimate E per sample, using the two respective histograms together as $$E = E_1(\eta) + E_1(\partial) - \frac{1}{2}\log_2\frac{1}{1-R_\eta^2} - \frac{1}{2}\log_2\frac{1}{1-R_\partial^2} \text{ bits.}$$

What is claimed is:

1. A digital hardware device, comprising:
a pseudo-random source, implemented in hardware, configurable for generating a binary pseudo-random input sequence having a first entropy; and
an entropy accumulator, implemented in hardware, coupled to the pseudo-random source and configurable for accumulating the first entropy and providing a binary pseudo-random output sequence based on the accumulated first entropy and a cryptographic prime.

2. The digital hardware device of claim 1, wherein the pseudo-random source is a low-entropy pseudo-random number generator.

3. The digital hardware device of claim 1, wherein the entropy accumulator is a chaos system.

4. The digital hardware device of claim 3, wherein the chaos system is a chaotic map.

5. The digital hardware device of claim 4, wherein the chaotic map is a quartic chaotic map.

6. The digital hardware device of claim 5, wherein the quartic chaotic map is given by $r_{n+1} = ((r_n + w_n)^4 + (r_n + n)^4) \bmod p$, where w is an m-bit portion of the input sequence, n is the current iteration of the quartic chaotic map, p is the cryptographic prime, and $r_{n+1}$ is a q-bit portion of the output sequence.

7. The digital hardware device of claim 1, wherein the entropy accumulator accumulates at least N samples generated by the pseudo-random source, where $$N = \left\lceil \frac{\log_2 p}{E} \right\rceil,$$

p is the cryptographic prime and E is the first entropy.

8. The digital hardware device of claim 7, wherein the first entropy E is 2.9 bits per sample.

9. The digital hardware device of claim 1, wherein the cryptographic prime is set equal to an order of an elliptic curve.

10. A method of accumulating entropy, comprising:
at a first communication device coupled to a second communication device via an unsecured channel:
receiving a first pseudo-random sequence associated with a first entropy;
accumulating the first entropy;
generating a second binary pseudo-random sequence from the accumulated first entropy and a cryptographic prime; and
using the second binary pseudo-random sequence to generate or verify a digital signature to establish a communication session between the first and second communication devices over the unsecured channel.

11. The method of claim 10, further comprising:
repeating the accumulating step until the second binary sequence is of cryptographic strength.

12. The method of claim 11, further comprising:
periodically updating the second binary pseudo-random sequence based on a new binary pseudo-random sequence.

13. The method of claim 11, wherein the accumulating step is repeated at least N times, where $$N = \left\lceil \frac{\log_2 p}{E} \right\rceil,$$

where p is the cryptographic prime and E is the first entropy.

14. The method of claim 10, wherein the accumulating step includes iterating a chaotic map.

15. The method of claim 14, wherein the chaotic map is a quartic chaotic map given by $r_{n+1}=((r_n+w_n)^4+(r_n+n)^4) \bmod p$, where w is an rn-bit portion of the input sequence, n is the current iteration of the quartic chaotic map, p is the cryptographic prime, and $r_{n+1}$ is a q-bit portion of the output sequence.

16. A computer-readable medium storing one or more programs configured to be executed by a computer system, the one or more programs comprising:
instructions to receive a first pseudo-random sequence associated with a first entropy;
instructions to accumulate the first entropy; and
instructions to generate a second binary pseudo-random sequence from the accumulated first entropy and a cryptographic prime, wherein the second binary pseudo-random sequence is associated with a second entropy that is higher than the first entropy.

17. The computer readable storage medium of claim 16, further comprising:
instructions to repeat the accumulating step until the second binary sequence is of cryptographic strength.

18. The computer readable storage medium of claim 17, further comprising:
instructions to periodically update the second binary pseudo-random sequence based on a new binary pseudo-random sequence.

19. The computer readable storage medium of claim 17, wherein the instructions to repeat the accumulating step include instructions to repeat the accumulating step at least N times, where $$N = \left\lceil \frac{\log_2 p}{E} \right\rceil,$$

where p is the cryptographic prime and E is the first entropy.

20. The computer readable storage medium of claim 16, wherein the instructions to accumulate the first entropy include instructions to iterate a chaotic map.

21. The computer readable storage medium of claim 20, wherein the chaotic map is a quartic chaotic map given by $r_{n+1}=((r_{n+wn})^4+(r_n+n)^4) \bmod p$, where w is an rn-bit portion of the input sequence, n is the current iteration of the quartic chaotic map, p is the cryptographic prime, and $r_{n+1}$ is a q-bit portion of the output sequence.

22. A digital signature generation system, comprising:
a processor;
a computer readable medium coupled to the processor and having stored thereon instructions, which, when executed by the processor, causes the processor to perform the operations of:
receiving a first pseudo-random number;
accumulating entropy associated with the first pseudo-random number;
generating a second pseudo-random number from the accumulated entropy, wherein the second pseudo-random number is from a finite field of numbers;
generating field elements defining a first point on an elliptic curve defined over the finite field of numbers by performing elliptic curve arithmetic on the second pseudo-random number and an initial public point on the elliptic curve;
generating a product from a field element, a private key, and a third pseudo-random number from the finite field of numbers, wherein the third pseudo-random number is received from a challenger seeking verification of a digital signature;
generating a signature component by summing the product and the second pseudo-random number;
reducing the signature component using one or more modular reduction operations, wherein the modular reduction operations are based on a modulus equal to an order of the elliptic curve; and
sending the signature component and the field elements to the challenger as a signature for verification by the challenger.

23. A digital signature verification system, comprising:
a processor;
a computer readable medium coupled to the processor and having stored thereon instructions, which, when executed by the processor, causes the processor to perform the operations of:
generating a first pseudo-random number;
accumulating entropy associated with the first pseudo-random number;
generating a second pseudo-random number based on the accumulated entropy, wherein the second pseudo-random number is from a finite field of numbers;
sending the second pseudo-random number to a signing device;
receiving a digital signature packet from the signing device including a first point on an elliptic curve defined over the finite field of numbers and a signature component, wherein the signature is a function of the second pseudo-random number and a third pseudo-random number generated by the signing device;
generating a second point on the elliptic curve defined over the finite field of numbers by performing elliptic curve arithmetic on the signature component and an initial public point on the elliptic curve;
generating a product from the second point and the second pseudo-random number;
reducing the product using one or more modular operations, wherein the modular operations are based on a modulus equal to an order of the elliptic curve;
generating a third point on the elliptic curve defined over the finite field of numbers by performing elliptic curve arithmetic on the reduced product and a public point on the elliptic curve representing a public key of the signing device; and
evaluating an elliptic identity using the first, second and third points, wherein the result of the evaluation is indicative of either a positive or negative verification of the digital signature.

24. A communication device, comprising:
memory;
one or more processors; and
one or more programs stored in the memory and configured for execution by the one or more processors, the one or more programs including:
instructions to receive a first pseudo-random sequence associated with a first entropy;
instructions to accumulate the first entropy;
instructions to generate a second binary pseudo-random sequence from the accumulated first entropy and a cryptographic prime; and
instructions to use the second binary pseudo-random sequence to generate or verify a digital signature to establish a communication session between the first and second communication devices.

25. The communication device of claim 24, further comprising:
instructions to repeat the accumulating step until the second binary sequence is of cryptographic strength.

26. The communication device of claim 25, further comprising:

instructions to periodically update the second binary pseudo-random sequence based on a new binary pseudo-random sequence.

27. The communication device of claim 25, wherein the instructions to repeat the accumulating step include instructions to repeat the accumulating step at least N times, where $$N = \left\lceil \frac{\log_2 p}{E} \right\rceil,$$

where p is the cryptographic prime and E is the first entropy.

28. The communication device of claim 24, wherein the instructions to accumulate the first entropy include instructions to iterate a chaotic map.

29. The communication device of claim 28, wherein the chaotic map is a quartic chaotic map given by $r_{n+1} = ((r_n + w_n)^4 + (r_n + n)^4) \mod p$, where w is an rn-bit portion of the input sequence, n is the current iteration of the quartic chaotic map, p is the cryptographic prime, and $r_{n+1}$ is a q-bit portion of the output sequence.

* * * * *

UNITED STATES PATENT AND TRADEMARK OFFICE
CERTIFICATE OF CORRECTION

PATENT NO. : 7,587,047 B2  Page 1 of 1
APPLICATION NO. : 11/159657
DATED : September 8, 2009
INVENTOR(S) : Crandall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Twenty-first Day of September, 2010

David J. Kappos
*Director of the United States Patent and Trademark Office*